Patented June 17, 1952

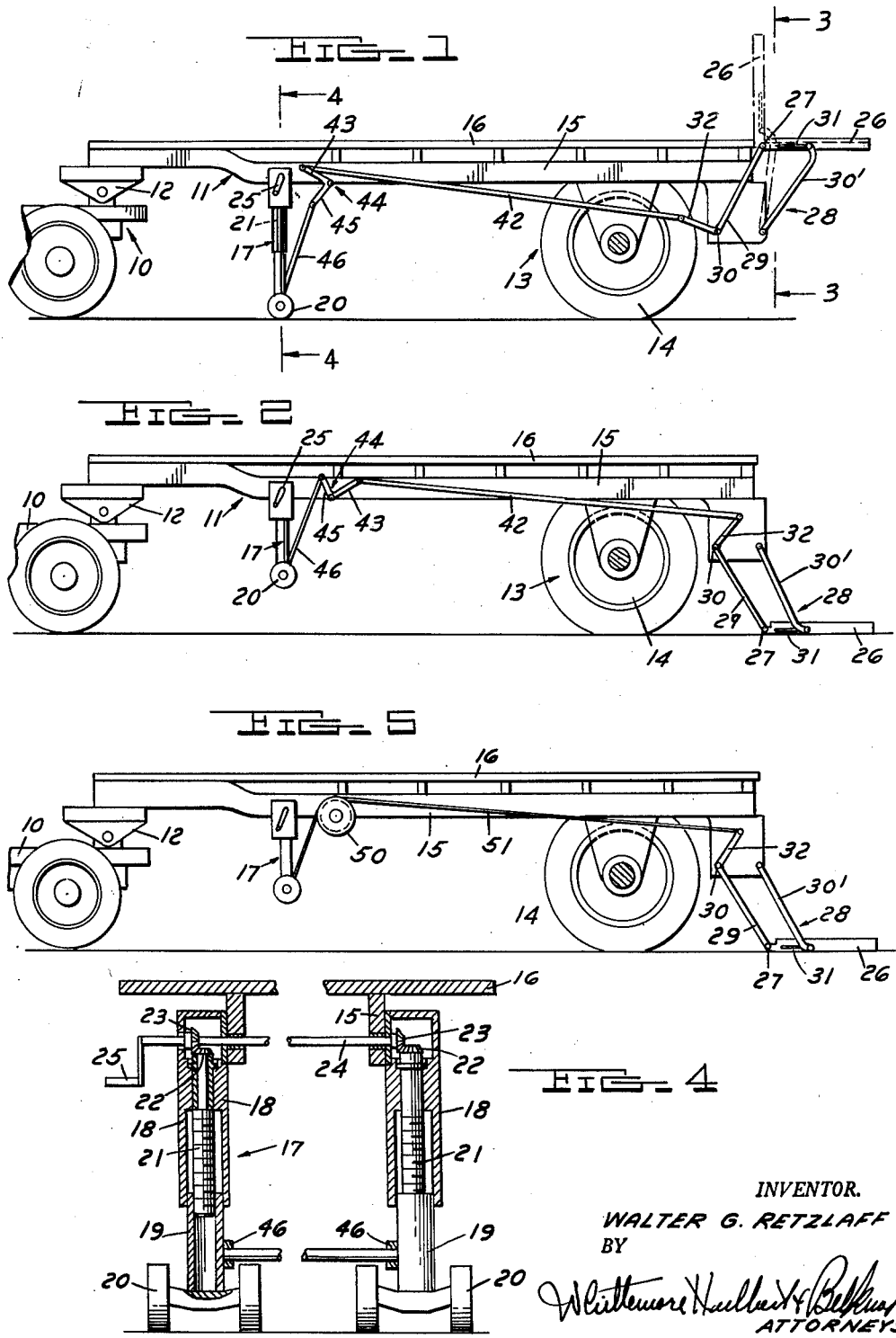

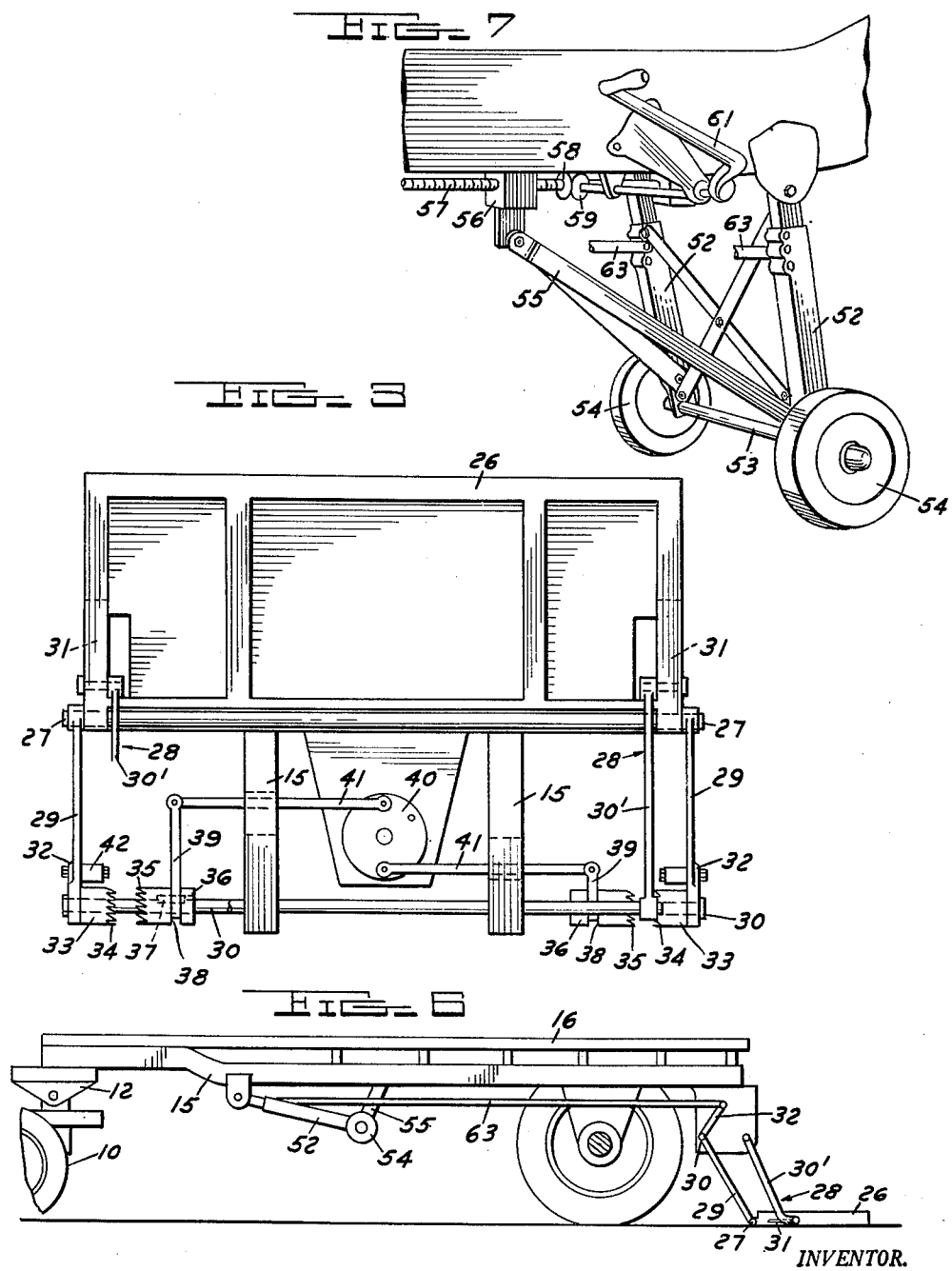

2,601,170

UNITED STATES PATENT OFFICE 2,601,170

TRAILER VEHICLE WITH LANDING GEAR AND TAIL GATE ELEVATOR

Walter G. Retzlaff, Grosse Pointe, Mich.

Application November 21, 1949, Serial No. 128,634

9 Claims. (Cl. 214—77)

This invention relates to load carrying vehicles of the type having a retractable landing gear unit and having a vertically movable load transfer platform.

It is an object of this invention to raise and lower the load transfer platform in response to movement of the landing gear in opposite directions relative to the vehicle body structure. In accordance with the present invention the retractable landing gear is operatively connected to the load supporting platform in a manner such that movement of the landing gear in one direction lowers the platform from a position adjacent the vehicle body flooring to a position in relatively close proximity to the ground, and movement of the landing gear in the opposite direction returns the platform to its uppermost position with respect to the vehicle body.

It is another object of this invention to provide an arrangement of the above type wherein the load supporting platform may be swung to an upright position and serve the purpose of a tail or end gate for the vehicle body.

Still another object of this invention is to provide means for releasing the operative connection between the retractable landing gear and load supporting platform to enable operation of the landing gear independently of the platform.

It is a further feature of this invention to provide a construction of the foregoing type composed of a relatively few simple parts capable of being inexpensively manufactured, assembled and installed.

The foregoing as well as other objects will be made more apparent as this description proceeds, especially when considered in connection with the accompanying drawings, wherein:

Figure 1 is a diagrammatic side elevational view of a vehicle embodying the features of this invention, and showing the load supporting platform in its raised position;

Figure 2 is a view similar to Figure 1 showing the load supporting platform in its lowermost position with respect to the vehicle;

Figure 3 is a sectional view taken on the line 3—3 of Figure 1;

Figure 4 is a sectional view taken on the line 4—4 of Figure 1;

Figure 5 is a diagrammatic side elevational view of a modified form of construction;

Figure 6 is a diagrammatic side elevational view of a further embodiment of this invention; and Figure 7 is a fragmentary perspective view of the landing gear mechanism shown in Figure 6.

For the purpose of illustrating the present invention, I have selected a vehicle commonly known to the trade as a semi-trailer, although it will be understood as this description proceeds that the invention may be applied to other types of load carrying vehicles.

Referring first to the embodiment of the invention shown in Figures 1 to 4 inclusive, it will be noted that the numeral 10 designates a tractor, and the numeral 11 indicates a semi-trailer. The tractor 10 may be any one of a number of orthodox designs having a fifth wheel assembly 12 at the rear for supporting the front end of the trailer 11. The rear end of the trailer 11 is supported in the usual manner by a rear axle assembly 13 including ground engaging wheels 14. In accordance with conventional practice the trailer 11 has a frame 15 and a load carrying platform 16 suitably supported on the frame 15.

When the trailer 11 is unattended by the tractor 10, the front end of the same is supported from the ground by a retractable landing gear unit 17. As shown in Figure 4 the retractable landing gear comprises a pair of vertical sleeves 18 respectively secured in a vertical position at opposite sides of the frame 15, and a pair of vertical supports 19 respectively slidably supported in the lower ends of the sleeves. The supports 19 are in the form of tubes having ground engaging wheels 20 suitably mounted at the lower ends thereof and having the upper ends internally threaded for threadably engaging the lower ends of suitable screws 21. Bevelled gears 22 are respectively secured to the screws 21, and are adapted to mesh with correspondingly bevelled gears 23 secured to a transverse shaft 24. The shaft 24 is journalled on the frame 15 and is fashioned at one end for receiving a suitable handle 25. The construction is such that when the handle 25 is rotated in opposite directions, the tubular supports 19, together with the ground engaging wheels 20, are respectively raised and lowered with respect to the ground. In Figure 2 of the drawings the landing gear 17 is shown in its retracted position, wherein the ground engaging wheels 20 are spaced above the ground, and in Figure 1 of the drawings, the landing gear is shown in its extended position wherein the wheels 20 contact the ground to support the front end of the semi-trailer 11.

Supported at the rear end of the trailer 11 is a load carrying platform 26. The platform 26 extends transversely of the vehicle, and has a shaft 27 suitably secured to the front edge thereof. The opposite end portions of the platform 26 are respectively connected to the rear end of the frame 15 by two pairs of links 28 arranged with the links in each pair in parallel relationship. The rear ends of the links 29 of each pair are pivoted on the shaft 27 in spaced relation to each other lengthwise of this shaft, and the opposite ends of the links 29 are secured to a shaft 30 which is suitably journalled on the frame 15 of the vehicle. The rear ends of the other links 30' of each pair are pivotally connected to the platform 26 and the opposite ends are pivoted on the frame 15. The pivots for the rear ends of the links 30' extend into elongated slots 31 formed in adjacent structural parts of the platform 26. The purpose of the slots 31 is to enable the platform 26 to be swung from the horizontal position thereof shown in Figure 1 of the drawings to an upright position shown by the broken lines in Figure 1, where it serves as a tail or end gate for the vehicle. Any suitable means (not shown herein) may be provided for latching the platform 26 in its upright position.

Referring now to Figure 3 of the drawings, it will be noted that a pair of levers 32 are rotatably supported on the shaft 30 at points spaced from each other lengthwise of the shaft. The inner surfaces of the hub portions 33 of the levers 32 are formed with clutch teeth 34, which respectively engage corresponding clutch teeth 35 on the adjacent ends of a pair of sleeves 36. The sleeves 36 are splined on the shaft 30 for sliding movement toward and away from the levers 32 by means of keys 37. The inner ends of the sleeves 36 are provided with annular grooves 38 and shifting forks 39 are respectively engaged in the grooves. The shifting forks are operated by a disc 40 suitably rotatably supported on the frame 15 intermediate the sleeves 36, and having diametrically opposed portions respectively connected to the shifting forks 39 by rods 41. The arrangement is such that rotation of the disc 40 in the direction of the arrow in Figure 3 of the drawings moves the sleeves 36 toward one another along the shaft 30 to disengage the clutch teeth 35 on the sleeves from the clutch teeth 34 on the adjacent lever 32. On the other hand, rotation of the disc 40 in the opposite direction shifts the sleeves 36 outwardly to engage the clutch teeth 35 with the corresponding teeth 34 on the adjacent levers 32 and thereby secure these levers to the shaft 30. Any suitable means not shown may be conveniently located on the vehicle for rotating the operating disc 40.

The free ends of the levers 32 are respectively connected to the rear ends of suitable linear members, such for example, as rods 42. The front ends of the rods 42 are respectively pivotally connected to the arms 43 of a pair of bell crank levers 44. The bell crank levers 44 are respectively pivotally supported at opposite sides of the frame 15 adjacent the retractable landing gear 17 for rocking movement about a common axis parallel to the axis of the shaft 30. The other arms 45 of the bell crank levers 44 are respectively connected by rods or linear members 46 to the lower ends of the tubular supports 19 on the retractable landing gear 17.

Assuming that the levers 32 are secured to shaft 30 by the clutch sleeves 36, it will be noted that downward movement of the ground engaging wheels 20 or tubular supports 19 of the retractable landing gear rocks the shaft 30 in a clockwise direction through the medium of the bell crank levers and associated connections. Rotative movement of the shaft 30 in a clockwise direction raises the load supporting platform 26 from the lowermost position thereof adjacent the ground, shown in Figure 2 of the drawings to the position shown in Figure 1, wherein the platform lies in substantially the same plane as the load carrying platform 16 of the vehicle. Thus a load deposited on the platform in its lowermost position shown in Figure 2 may be readily raised to a position where it may be conveniently transferred to the load carrying platform 16 of the vehicle with a minimum amount of effort.

Assuming now that the platform is in its elevated position shown in Figure 1 of the drawings and that it is desired to lower the load on the platform to practically ground level, the handle 25 on the retractable landing gear is merely rotated in the opposite direction to raise the tubular supports 19 together with the ground engaging wheels 20. Due to the connection between the tubular supports 19 and bell crank levers, upward movement of the supports to retract the ground engaging wheels rocks the shaft 30 in an anti-clockwise direction, and through the parallel links 28, lowers the platform 26 to the position shown in Fig. 2 of the drawings. As a result the load on the vehicle may be readily transferred to the ground with very little effort on the part of the operator.

When it is desired to operate the retractable landing gear independently of the load carrying platform, the disc 40 is merely rotated in the direction of the arrow shown in Figure 3 of the drawings. As a result of this rotation of the disc, the sleeves 36 are moved inwardly along the shaft 30 to disengage the teeth 35 from the corresponding teeth 34 on the adjacent operating levers 32. When the sleeves 36 are disengaged from their respective levers 32, the latter are free to rotate on the shaft 30, and have no effect whatsoever on the platform 26.

The embodiment of the invention shown in Figure 5 of the drawings is similar to the one previously described, with the exception that the bell crank levers are omitted, and pulleys are respectively rotatably supported on the frame 15 at opposite sides thereof. A pair of cables 51 respectively connect the lower ends of the tubular supports 19 to the operating levers 32, and these cables are extended over the pulleys 50. With the above exception, the construction shown in Figure 5 is the same as the one shown in Figures 1 to 4 inclusive, and corresponding parts are designated by the same reference numerals.

Referring now to the embodiment of the invention shown in Figure 6 of the drawings, it will be noted that this construction is similar to the one described in connection with Figures 1 to 4 inclusive, with the exception that a swinging type retractable landing gear is illustrated. The landing gear is shown more in detail in Figure 7 of the drawings, and embodies a pair of uprights 52 having the upper ends respectively pivotally supported on the frame 15 at opposite sides thereof. An axle 53 is suitably journalled on the lower ends of the uprights 52, and ground engaging wheels 54 are supported on opposite ends of the axle 53.

A diagonal strut 55 is connected at the lower end to the axles 53 and is connected at the upper end to a nut 56. The nut 56 is threaded on a screw 57 extending lengthwise of the vehicle frame and suitably journalled on the latter. A bevelled gear 58 is secured to one end of the screw, and meshes with a corresponding bevelled gear 59 secured to a transverse shaft 60. One end of the shaft 60 projects beyond one side of the frame and is fashioned to receive a crank handle 61. The arrangement is such that rotation of the handle 61 in one direction swings the retractable landing gear from an upright position with respect to the vehicle frame to an inoperative position in underlying relationship to the vehicle frame 15. On the other hand, rotation of the crank handle 61 in the opposite direction returns the landing gear to its upright position wherein the wheels 54 again engage the ground and support the front end of the trailer.

The uprights 52 are respectively connected to the free ends of the lever arms 32 by linear members 63, so that swinging movement of the retractable landing gear in opposite directions respectively raises and lowers the platform 26 in the same manner previously described.

What I claim as my invention is:

1. A vehicle having in combination a load carrying body structure, a landing gear supported on the body structure for up and down movement between retracted and ground engaging positions, selectively operable means for raising and lowering the landing gear relative to the body structure, a member supported at one end of the body structure and providing a combined end gate and loading platform, means connecting the member to the body structure enabling swinging movement of the member from an upright position relative to the body structure to a substantially horizontal position relative to the body structure and permitting substantially vertical movement of said member between an elevated position adjacent the body structure and a position adjacent the ground, and means operated by the landing gear operating means for raising and lowering said member.

2. A vehicle having in combination a load carrying body structure, a landing gear supported on the body structure for up and down movement between retracted and ground engaging positions, selectively operable means for raising and lowering the landing gear relative to the body structure, a member supported at one end of the body structure and providing a combined end gate and loading platform, means connecting said member to the body structure including a pair of substantially parallel links having the opposite ends respectively pivotally connected to the body structure and member enabling vertical swinging movement of the links, the pivotal connection between one link and the member being slidable relative to the member to enable swinging said member between substantially upright and horizontal positions relative to the body structure, and an operative connection between the other of said links and landing gear for raising and lowering the member upon movement of the landing gear in opposite directions.

3. A vehicle having in combination a load carrying body structure, a landing gear supported on the body structure for up and down movement between retracted and ground engaging positions, selectively operable means for raising and lowering the landing gear relative to the body structure, a loading platform supported at one end of the body structure, means connecting the loading platform to the body structure permitting up and down movement of the loading platform relative to the body structure, said connecting means including a pair of substantially parallel links having the opposite ends respectively pivotally connected to the loading platform and body structure permitting vertical swinging movement of the links, and means operated by the landing gear operating means for raising and lowering said loading platform.

4. A vehicle having in combination a load carrying body structure, a landing gear supported on the body structure for up and down movement between retracted and ground engaging positions, selectively operable means for raising and lowering the landing gear relative to the body structure, a combined end gate and loading platform pivotally supported on the body structure for swinging movement from an upright position to a substantially horizontal position, a shaft supported on the body structure for rotation about an axis extending substantially parallel to the axis of pivotal movement of the platform, links having corresponding ends rotatably supported on the shaft and having the opposite ends pivoted to the platform, clutch means for securing said corresponding ends of the links to the shaft, means operated by the landing gear operating means for rotating the shaft in one direction upon upward movement of the landing gear and for rotating the shaft in the opposite direction upon downward movement of the landing gear, guide links having corresponding ends pivoted to the body structure for pivotal movement about an axis parallel to said shaft and having means at the opposite ends slidably and pivotally connected to the platform.

5. A vehicle having in combination a load carrying body structure, a landing gear supported on the body structure for up and down movement between retracted and ground engaging positions, selectively operable means for raising and lowering the landing gear relative to the body structure, a loading platform supported at one end of the body structure, means connecting the loading platform to the body structure permitting up and down movement of the loading platform relative to the body structure, and means operated by the landing gear operating means for raising and lowering said loading platform.

6. The structure set forth in claim 5, said last-named means comprising an operative connection between the landing gear and loading platform responsive to movement of the landing gear in one direction to raise the loading platform and responsive to movement of the landing gear in the opposite direction to lower said loading platform.

7. The structure set forth in claim 6, in which means is provided for releasing the operative connection between the landing gear and loading platform to enable movement of said landing gear independently of the loading platform.

8. A vehicle having in combination a load carrying body structure, a landing gear supported on the body structure for up and down movement between retracted and ground engaging positions, means for raising and lowering the landing gear relative to the body structure, a loading platform supported at one end of the body structure, means connecting the loading platform to the body structure permitting up and down movement of the loading platform relative to the body structure, and means operative to lower the loading platform in response to upward movement of the landing gear and to raise said loading platform in response to downward movement of the landing gear.

9. A vehicle having in combination a load carrying body structure, a landing gear supported on the body structure for up and down movement between retracted and ground engaging positions, means for raising and lowering the landing gear relative to the body structure, a loading platform, means connecting the loading platform to the body structure permitting up and down movement of the loading platform relative to the body structure, and means operative to raise and lower the loading platform in response to movement of the landing gear in opposite directions.

WALTER G. RETZLAFF.

REFERENCES CITED

The following references are of record in the file of this patent:

UNITED STATES PATENTS

| Number | Name | Date |
| --- | --- | --- |
| 1,316,661 | Winn | Sept. 23, 1919 |
| 1,763,535 | Nuttall | June 10, 1930 |
| 1,885,468 | Nevin | Nov. 1, 1932 |
| 1,916,869 | Stewart et al. | July 4, 1933 |
| 1,929,112 | Hansen | Oct. 3, 1933 |
| 1,970,014 | Molinare | Aug. 14, 1934 |
| 2,267,270 | Deetz et al. | Dec. 23, 1941 |
| 2,492,364 | Levy | Dec. 27, 1949 |

FOREIGN PATENTS

| Number | Country | Date |
| --- | --- | --- |
| 411,542 | Great Britain | June 14, 1934 |
| 470,114 | Great Britain | Aug. 10, 1937 |
| 851,008 | France | Jan. 2, 1940 |